United States Patent [19]

Dierikx

[11] Patent Number: 5,010,245
[45] Date of Patent: Apr. 23, 1991

[54] RADIATION TRANSDUCING DEVICE WITH LOCATION IDENTIFICATION

[75] Inventor: Bart M. H. L. Dierikx, Mortsel, Belgium

[73] Assignee: Interuniversitair Micro-Elektronica Centrum VZW, Belgium

[21] Appl. No.: 356,800

[22] Filed: May 25, 1989

[30] Foreign Application Priority Data

May 25, 1988 [NL] Netherlands ............ 8801342

[51] Int. Cl.$^5$ ............................................. H01J 40/14
[52] U.S. Cl. ................................ 250/208.1; 250/206.2
[58] Field of Search .............. 250/578, 203 R, 203.2, 250/203.3, 203.4, 578.1, 208.1, 208.2, 206.1, 206.2; 356/141, 152, 222

[56] References Cited

U.S. PATENT DOCUMENTS

| | | | |
|---|---|---|---|
| 4,214,826 | 7/1980 | Uchida | 356/222 |
| 4,219,845 | 8/1980 | Gibbons | 358/105 |
| 4,445,030 | 4/1984 | Carlton | 250/203.4 |
| 4,465,369 | 8/1984 | Saegusa | 356/222 |
| 4,491,727 | 1/1985 | Appelbaum | 250/203.4 |
| 4,547,677 | 10/1985 | Parker | 250/578 |
| 4,664,495 | 5/1987 | Alyfuku | 356/222 |
| 4,672,191 | 6/1987 | Cofield | 250/203.4 |

FOREIGN PATENT DOCUMENTS 0157141 10/1985 European Pat. Off. .
0260858  3/1988 European Pat. Off. .
WO84/03810 9/1984 PCT Int'l Appl. .
WO89/01129 2/1989 PCT Int'l Appl. .

OTHER PUBLICATIONS

The VLSL Design of a Two Dimensional Image Processing Array, by Dimokritos Panogiotopoulos et al., Microprocessing and Microprogramming. vol. 14, No. 3/4, Oct./Nov. 1984 (Amsterdam, NL).

Primary Examiner—David C. Nelms
Attorney, Agent, or Firm—Ostrolenk, Faber, Gerb & Soffen

[57] ABSTRACT

A transducing device for sensing incident radiation includes an array of radiation sensitive elements, arranged in a matrix and interconnected to provide a plurality of interconnected rows and a plurality of interconnected columns of radiation sensitive elements. Comparator elements are connected to rows and columns of elements for comparing the magnitude of radiation received by the radiation sensitive elements to a predetermined threshold value. Encoding elements respond to outputs of the comparator elements for identifying radiation sensitive elements which have been exposed to radiation, including those elements where the radiation is maximum. The invention obviates the necessity of processing information from a large number of elements which do not hold useful information therein.

14 Claims, 2 Drawing Sheets

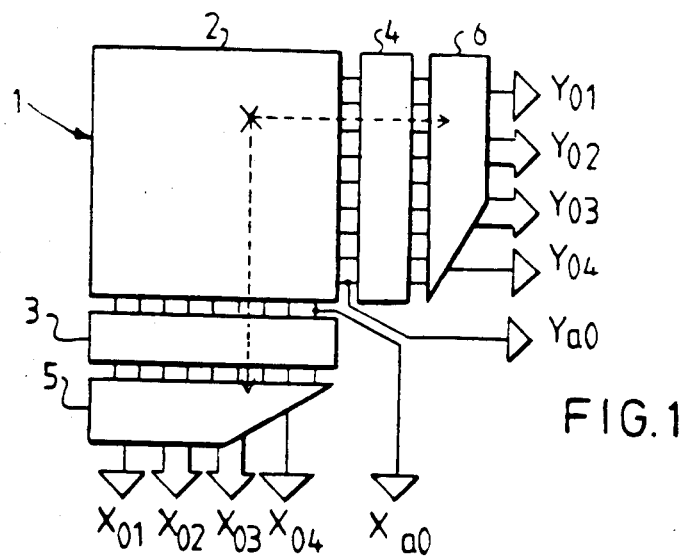
FIG. 1
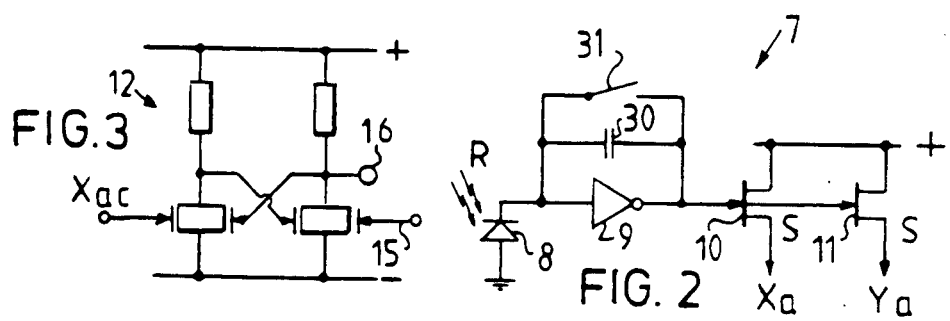
FIG. 3
FIG. 2
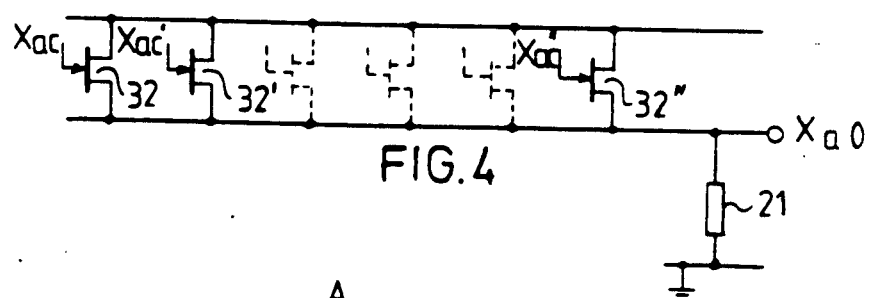
FIG. 4
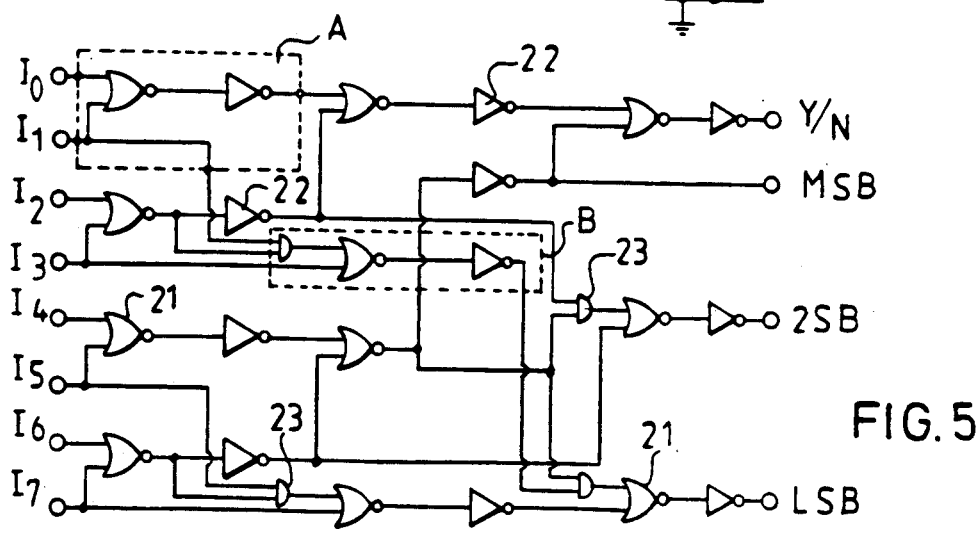
FIG. 5

RADIATION TRANSDUCING DEVICE WITH LOCATION IDENTIFICATION

BACKGROUND OF THE INVENTION

The present invention relates to a radiation transducing device.

Radiation transducing devices of the prior art, e.g. EP-A-015714, consist of a matrix of pixel elements wherein each pixel element is scanned sequentially, similar to the scanning of pixel elements in a television or video apparatus.

The state of the prior art is further described in EP-A-0260858 and in the article: "The VLSI design of a two dimensional image processing array" of D. Panogiotopoulos e.a., published in Microprocessing and Microprogramming, vol. 14, no. 1, October/November 1984.

As background material for the present invention, the aforementioned patents and literature are incorporated by referenced herein as is an article written by the present inventor entitled: Nuclear Instruments and Methods in Physics Research, published by North Holland Amsterdam, March 1989, Volume A275, No. 3, Section A, Page 542.

When scanning a picture area in which only one or some locations contain radiation to be detected, the transducing devices of the prior art produce an enormous amount of signals the information content of which has substantially no value at all.

SUMMARY OF THE INVENTION

It is an object of the present invention to improve upon the prior art and to provide a new radiation transducing device.

The present invention provides a transducing device with an array of elements and with comparing means for comparing the amount of radiation received by the individual elements against a predetermined threshold value. Processing of information can be controlled to limit the processing to those elements which contain useful information.

The field of application of the present invention concerns fast sequential recording of collisions of elementary particles in experiments at high energy storage rings, e.g. at CERN, as well as the continuous watching of ground environment, e.g. detection of flashes of lightning occurring above the ground.

A preferred embodiment is provided with means for detecting two or more so-called events separately.

Further advantages, features and details will be clarified in view of a preferred embodiment of a radiation transducing device according to the present invention, described with reference to the drawings, in which:

BRIEF DESCRIPTION OF THE DRAWINGS

FIG. 1 is a diagram of a preferred embodiment of a radiation transducing device according to the present invention;

FIG. 2 is a diagram of an embodiment of a radiation sensitive element of the diagram of FIG. 1;

FIG. 3 is a diagram of a comparator element of FIG. 1;

FIG. 4 is a circuit diagram of source followers of FIG. 2;

FIG. 5 is a circuit diagram of encoding elements of FIG. 1;

DETAILED DESCRIPTION OF THE DRAWING

Figure 6:
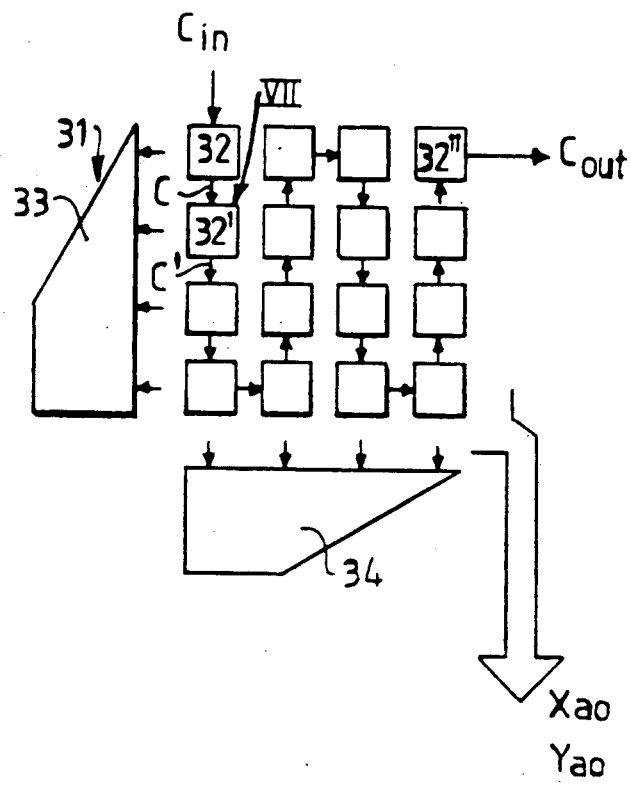
FIG. 6 is a diagram of a second preferred embodiment of a radiation transducing device according to the present invention.

A preferred embodiment of a radiation transducing device 1 (FIG. 1) comprises a matrix 2 in the form of an array of radiation sensitive (pixel) elements arranged in rows ("x" direction) and in columns ("y" direction). Each row and column of interconnected pixel elements is respectively connected to a comparator element in the comparator blocks 4 and 3, as shown in FIG. 1. Each of comparator blocks 3 and 4 is respectively connected to encoding blocks 5 and 6 which have outputs $x_{01}, x_{02}, x_{03}, x_{04}, y_{01}, y_{02}, y_{03}$ and $y_{04}$ which are shown in FIG. 1 and explained further herein. Note that the outputs $x_{a0}, y_{a0}$ are respectively directly derivable from the outputs of the matrix, i.e. pixel elements.

A preferred embodiment of a pixel element 7 (FIG. 2) of the matrix 2 comprises a radiation sensitive element in the form of a photo sensitive diode 8 on which radiation R is incident. The diode 8 is connected through an inverting amplifier 9 having FET's 10, 11 for producing a respective signal $(x_a, y_a)$ for being supplied to comparator blocks 3 and 4. The FET's 10 and 11 are connected as source followers. A capacitor 30 and a electronic reset switch 31 are connected across the inverting amplifier 9, as shown.

Outputs $x_{ac}$ and $y_{ar}$ produce (in a manner not shown, but similar to the way shown in FIG. 4) for each column and row a respective output signal $x_{ac}, y_{ac}$, which form a common output signal for each column and row of the matrix 2 for the purpose of deriving such a common output signal, all the source followers 10, 10', 10" etc., (for the "X" direction pixel elements) and all the source follows 11, 11', 11" etc. (for the "y" direction pixel elements) are connected in parallel, resulting in a respective common output for each row and column of pixel elements.

A comparator element, e.g. a NOR-flipflop 12 (FIG. 3), is connected to the output $x_{ac}$ (and $y_{ar}$) of each row (and column) of the pixel matrix. A threshold value for switching which is dependent on the amount of incident radiation on a photosensitive diode 8 is determined by the dc bias level of the input $x_{ac}$ relative to the negative supply voltage. This dc bias level can be set, for example, by means of the setting of the inverting amplifiers 9. The input 15 of the NOR-flipflop 12 forms a reset terminal, used to initialize a new image recording. The output 16 has a logic "0" or "1" value, dependent on whether or not the amount of incident radiation to the corresponding column (or row) of the matrix is higher than a predetermined (and preset) value.

The (analog) output $x_{a0}$ (FIG. 4) (and $y_{a0}$ in a corresponding row) is formed, because the source followers 32, 32', 32" etc. are connected in parallel and in series to a load or measuring element 21. When radiation is incident to more than one row or column of the radiation sensitive elements 8, the voltage on the load 21 is that provided from the element having the largest amount of incident radiation. The load 21 will be, in most cases, a resistor, but may also be switchable capacitor.

The encoding block 5 and 6, preferably of similar structure, may be realized by means of a multiplexer. In this way a data reduction is achieved. For example, for a 100×100 image transducing element which has 10,000 pixel elements of, for example, 100×100 $\mu m^2$ each, a 10,000 to 100 data reduction is obtained for each image period. The image period can decrease from 1 msec to 10 μsec to correspondingly obtain an energy consumption reduction having a reduction factor of 100. Further, the number of clocks and power supplies for controlling the image transducing elements of the present invention is limited relative to known CCD transducing devices.

Preferably a combination logic circuit is used to form the encoding block 5 and 6, an embodiment of which (shown for simplicity as having only 8 bits) is disclosed in FIG. 5. The image period can be reduced to, for example, 100 nsec by means of this embodiment, or the energy consumption can be reduced to less than 1 mW.

The circuit of FIG. 5 comprises NOR-circuits 21, inverters 22 and AND-gates 23. The circuit is to be seen as built of base blocks A and B. The illustrated embodiment carries out the encoding for eight inputs ($I_0$–$I_7$) connected to outputs 16 of the comparator elements By means of blocks A and B, a circuit for a number of inputs larger than eight can be built in a simple way.

The circuit shown in FIG. 5 produces, looking from the top down, the following outputs:

Y/N which indicates whether or not an amount of radiation above a preset threshold value to the radiation transducing device is present;

MSB which is the most significant bit value of the row or column of the pixel element having the highest rank number of the pixel element to which radiation was incident;

2SB is the center bit value of a row or column having the highest rank number to which radiation was incident; and LSB is the least significant bit value of a row or column having the highest rank number of the pixel element to which radiation was incident.

When two encoding circuits of FIG. 5, in the preferred embodiment of the radiation transducing device (both to x and y side), are provided and inputs $I_0$–$I_7$ are supplied in an inverse sequence to the second encoding circuit, because one encoding circuit detects the lowest and the other the highest activated row (or column) value, the following may be determined from a comparison of bit values at those outputs.

obtaining the same result, i.e. equality, means that only pixel elements of one row or one column are activated by radiation; or obtaining an unequal result defines the borders of an area in which at least two rows (or columns) of pixel elements are activated.

Preferably the output of the encoding blocks 5 and 6 respectively contain the following information:

$x_{01}$ ($y_{01}$), a bit which defines whether or not a pixel element in a column (row) is activated (Y/N of FIG. 5);

$x_{02}$ ($y_{02}$), a digital number defining the highest column number (row number) of a column (row) of a pixel element which has been exposed to incident radiation;

$x_{03}$ ($y_{03}$), a digital number which defines the lowest column number (row number) of a column (row) of a pixel element which has been exposed to incident radiation; and $x_{04}$ ($y_{04}$), a bit value which defines whether or not the highest and lowest column number (row number) is equal; this bit value $x_{04}$ ($y_{04}$) is derived in a simple way through a logic circuit which compares the outputs of two logic circuits of FIG. 5.

A first radiation transducing device to be realized is completely monolitically integrated in a semiconductor substrate and comprises 32×32 pixel elements, of which the expectation is that 50% of the surface will be available to radiation sensitive elements.

Other possible embodiments include the so-called flipchip structure, in which a separate diode chip is connected to a separate chip for the peripheral electronics, and the so-called SOI technique, in which electronics is situated at the back side radiation sensitive elements, separated therefrom by silicon oxide.

Another preferred embodiment 31 (FIG. 6) of the present invention comprises pixel elements 32, 32', 32" etc. and encoding blocks 33 and 34, similar to those of FIG. 1. Further, a first pixel element 32 is externally provided with a carry-in signal $c_{in}$ and provides a further carry signal C to a second pixel element C' and so on until the last pixel element 32" which provides a carry-out signal $C_{out}$ that may be used for a further integrated transducing device.

Figure 7:
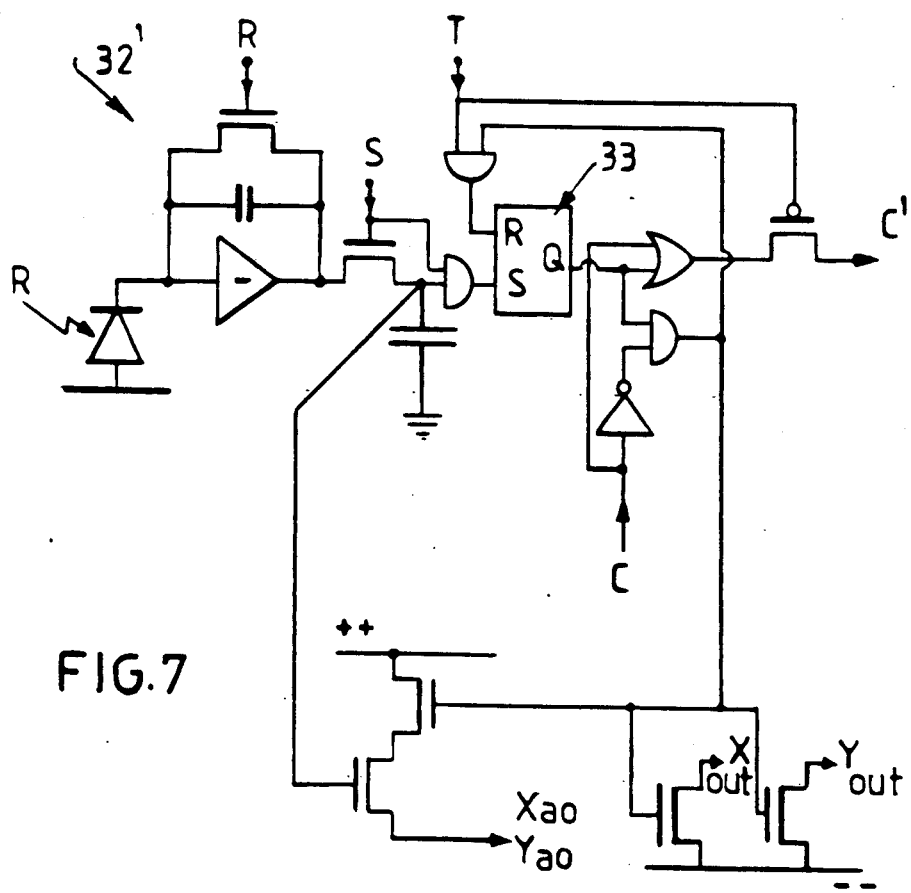
FIG. 7 is a diagram of detail VII in FIG. 6.

By means of a sample signal S (FIG. 7), a signal value related to the radiation R is transferred to a flip flop circuit 33 and by means of an additional clock signal T to an output carry signal C'. If a pixel element 32' did not detect radiation, an incoming carry signal C is passed as outgoing carry signal C' controlled by clock signal T. If, however, radiation above a threshold value was detected and incoming carry signal C has a zero value, than this means that this pixel element 32' is the first of all the pixel elements that has been "hit". By means of clock signal T the flip flop 33 is reset during the second half period of this clock signal.

By means of the carry signals C added by the sample signal S, the transducing device 31 is capable of reading out the row and column numbers of all the pixel elements hit by radiation and also the analog signal values $x_{ao}$ and $y_{ao}$ thereof, without much loss of speed.

Further modifications and variations of the present invention are possible within the scope of the present invention, defined by the annexed claims.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A radiation transducing device for transducing radiation, comprising: an array of radiation sensitive elements, comparator elements connected to at least a portion of said array for comparing the amount of radiation received by the radiation sensitive elements to a predetermined threshold value, encoding element connected to said comparator elements for producing an output effective for identifying the location of said radiation sensitive elements which have been exposed to radiation and measuring means connected to said radiation sensitive elements for determining the amount of incident radiation collected in an element during a predetermined time period.

2. The radiation transducing device of claim 1, in which the radiation sensitive elements are arranged in a matrix.

3. The radiation transducing device of claim 2, in which the matrix contains 100×100 elements.

4. The radiation transducing device of claim 2, in which the matrix contains 32×32 elements.

5. The radiation transducing device of claim 2, in which the matrix contains a plurality of rows of elements and a plurality of columns of elements and wherein the radiation sensitive elements of the same row and the same column are commonly connected to a respective comparator element for enabling identifying a row or column number.

6. The radiation transducing device of claim 5, in which two or more signals of two or more rows or columns of radiation sensitive elements are supplied to a common load for determining the maximum value of said signals.

7. The radiation transducing device of claim 1, in which said encoding elements comprise a combinatorial logic circuit.

8. The radiation transducing device of claim 7, in which two encoding elements are connected to the output of a respective single comparator element.

9. A radiation transducing device of claim 2, further including means for generating and propogating carry signals between the pixel elements in said array.

10. The radiation transducing device of claim 9, in which the carry signals generating means is effective for propogating the carry signals serially between the radiation sensitive elements.

11. The radiation transducing device of claim 10, in which the carry signals generating means comprises a sampling circuit for sampling the radiation contained in the radiation sensitive elements, a latching circuit for storing therein a result of the sampling, and a clocking circuit for clocking information through the latching circuit.

12. The radiation transducing device of claim 11, wherein the latching circuit comprises a flip flop.

13. The radiation transducing device of claim 2, in which the encoding elements comprise means for defining the boundaries of an area in the matrix in which at least two pixels are activated.

14. The radiation transducing device of claim 1, in which the device is completely monolitically integrated in a semiconductor substrate.

* * * * *